March 9, 1926. 1,575,643
E. F. SALICH
APPARATUS FOR AUTOMATICALLY CONTROLLING THE SPECIFIC GRAVITY OF FLUIDS
Filed Oct. 28, 1921 2 Sheets-Sheet 1
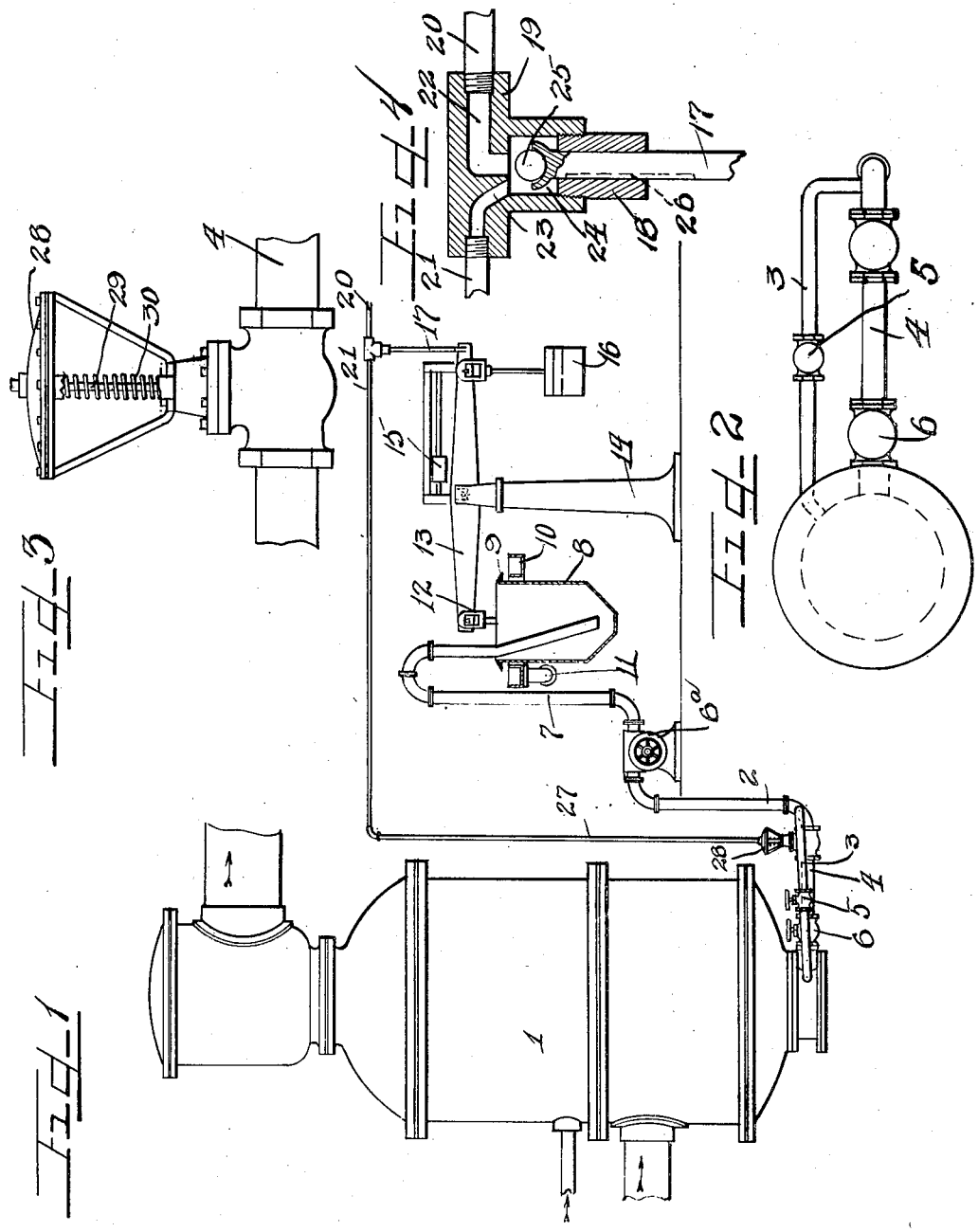

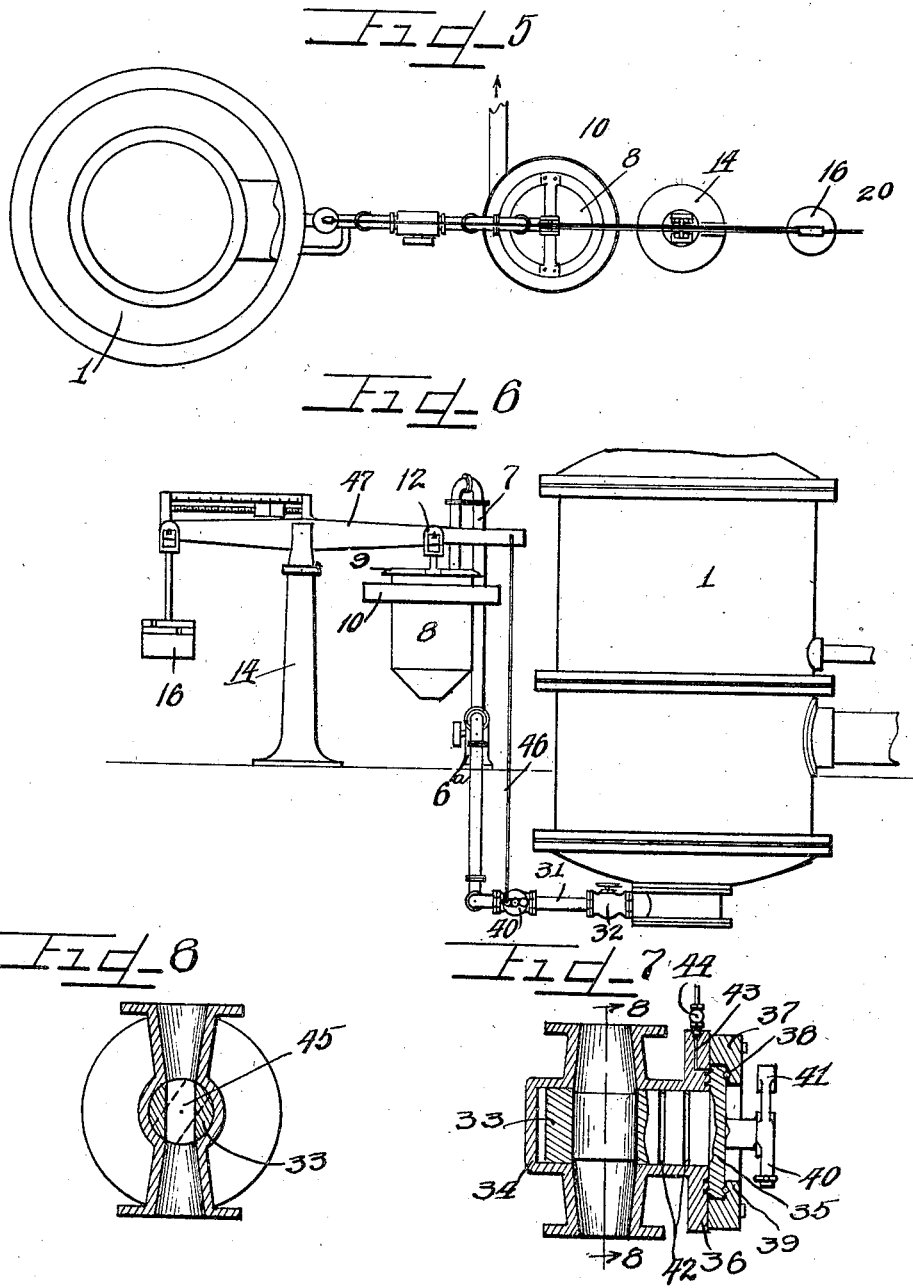

Patented Mar. 9, 1926.

1,575,643

UNITED STATES PATENT OFFICE.

EMILE F. SALICH, OF CHICAGO, ILLINOIS.

APPARATUS FOR AUTOMATICALLY CONTROLLING THE SPECIFIC GRAVITY OF FLUIDS.

Application filed October 28, 1921. Serial No. 511,031.

*To all whom it may concern:*

Be it known that I, EMILE F. SALICH, a citizen of the United States, and a resident of the city of Chicago, in the county of Cook and State of Illinois, have invented certain new and useful Improvements in an Apparatus for Automatically Controlling the Specific Gravity of Fluids; and I do hereby declare that the following is a full, clear, and exact description of the same, reference being had to the accompanying drawings, and to the numerals of reference marked thereon, which form a part of this specification.

This invention relates to an apparatus for automatically controlling the specific gravity of fluids.

In obtaining fruit juices, sugar or other syrups of in mixing mixable fluids having different specific gravities, it is highly desirable to obtain a product having a uniform specific gravity.

It is therefore an object of this invention to provide a self-regulating or automatically controlled apparatus for obtaining fluid of substantially uniform specific gravity.

With this and other objects in view which will become more apparent in the following description and disclosure, this invention comprises the novel mechanism and combinations hereinafter described, and more particularly pointed out and defined in the appended claims.

In the accompanying drawings which illustrate certain preferred embodiments of my invention and in which similar reference numerals refer to similar features in the different views:

Figure 1 is an elevational view of the apparatus involving my invention.

Figure 2 is a bottom plan view of a part of the apparatus upon an enlarged scale.

Figure 3 is an enlarged elevational view of a diaphragm valve used in my apparatus.

Figure 4 is a vertical section through an air valve forming a part of my apparatus, upon an enlarged scale.

Figure 5 is a top plan view of the apparatus as shown in Figure 1.

Figure 6 is an elevation of a modified form of apparatus involving my invention.

Figure 7 is a sectional view of a valve structure in my modified form of apparatus upon an enlarged scale.

Figure 8 is a section upon the line 8—8 of Figure 7.

As shown on the drawings:

In the drawing, I have illustrated a receiving tank or holder 1, which may be an evaporation or concentration tank commonly employed in treating syrups or the like or the same may be any mixing tank for receiving the fluids that are to be mixed in certain ratios.

In Figures 1 to 5, I have illustrated one form of the apparatus involving my invention in operative relation with the tank 1, and this apparatus comprises means for pumping the syrup or fluid from the tank 1 into a balanced receptacle which in unbalanced position operates certain mechanism to automatically regulate the flow of the syrup for changing the density of the mass in the receptacle. The form of mechanism adopted for accomplishing these functions comprises a pipe 2 connected to the tank 1 through a plurality of branch pipes 3 and 4 coupled to the pipe 2. The pipes 3 and 4 are provided with the standard rotary valves 5 and 6, and the diameter of the pipe 3 is much smaller than the diameter of the pipe 4 for a reason that will later appear.

The pipe 2 leads to a pump 6$^a$ which is preferably of the rotary type, but it is contemplated that a reciprocating pump may be used and the fluid or syrup pumped into a reservoir connected to the balanced receptacle to avoid the pounding effect of the reciprocating pump upon the balanced receptacle. The pump 6$^a$ raises the fluid through the siphon pipe 7 which empties into the balanced receptacle 8 near the bottom thereof in order that there may be proper diffusion of the contained mass, especially when the density of the same is being corrected through the operation of the automatic mechanism which will be presently described.

The balanced receptacle 8 is provided with an overflow rim or flange 9 over which the fluid or syrup flows into a stationary receiving conduit 10 which surrounds the receptacle 8 in spaced relation thereto at a suitable distance below the rim but supported independently of said receptacle and conveys the fluid to a discharge pipe 11.

The upper end of the receptacle 8 is provided with a suspension stirrup 12 which may be provided with knife edges upon its suspension surfaces for supporting engagement with the knife edges upon one end of the scale beam 13 supported upon the standard 14. The other end of the scale beam is preferably provided with a small slidable balance weight 15 and the suspended weights 16 supported from the knife edges as is common in scale construction.

The weight arm of the scale beam is connected to a valve rod 17 (Figure 4) which opens and closes a valve in an air supply system during the tilting movements of the scale beam when the same is unbalanced. To this end the rod 17 reciprocates in a plug 18 screwed into the valve housing 19, in which the air pipes 20 and 21 of the air system are connected. The housing 19 is provided with separate passages 22 and 23 which lead respectively from the pipes 20 and 21 to a common chamber 24 in which the valve 25 on the upper end of the rod 17 operates. When the rod 17 is elevated, the valve 25 will close the passage 22 and at the same time a small relief groove or bore 26 in the rod 17 will establish communication between the air chamber 24 and the atmosphere, as shown in Figure 4, whereby the pressure in the pipe 21 will be relieved.

The air pipe 21 is connected in a vertical pipe 27 which communicates with an air chamber 28 containing a diaphragm which is connected by a rod 29 to a valve in the pipe line 4. A coil spring 30 surrounds the rod 29 and becomes effective for raising the diaphragm and opening the valve in the pipe 4 when the pressure in the pipe line 27—21 is relieved. The diaphragm and valve have not been illustrated nor described since the same are of standard and well known construction.

It is of the utmost importance in order to obtain the best results, to proportion the balanced receptacle 8 so that it will contain only a mass of fluid such that the difference between the lower or higher density and the required density will be sufficient to satisfactorily register and operate the scale. Usually a total range or difference of about three pounds will suffice, so that the apparatus will be more readily sensitive to a small increment of weight caused by a variation in the density of the mass in the balanced receptacle.

With a known volume of fluid in the fluid receptacle 8, it is a simple matter to calculate its weight for a certain or predetermined density or specific gravity, and having balanced the empty receptacle, it is only necessary to add sufficient weight to the weight arm of the scale so that the scale will be in balance when the receptacle is filled with fluid or syrup of the predetermined specific gravity.

The receptacle 8 may be originally filled through the agency of the pump 6ª, or it may be filled by pouring therein a sufficient quantity of the fluid or syrup it is desired to obtain, and of proper density so that an initial balance is quickly obtained. It is, however, immaterial just how the receptacle is originally filled.

Assuming that the receptacle is filled to overflowing, and is balanced with the weights on the scale, and the pump 6ª is in operation, fluid or syrup will be drawn from the tank 1 through the pipe 3 and elevated through the siphon pipe 7 to the receptacle 8 since at this time the air valve 25 will be in open position and the automatic regulating valve in pipe 4 will be closed. The heaviest concentrate will at this time be drawn from the tank so the first tendency will be to increase the density and open the automatic valve in pipe 4. Now should the specific gravity of the fluid in the receptacle increase, it will raise the opposite end of the scale beam 13 and simultaneously raise the rod 17 to close the valve in the air line and simultaneously relieve the pressure on the diaphragm allowing the spring 29 to open the valve in the pipe 4. Accordingly, fluid will now be drawn through both pipes 3 and 4, and the volume of fluid entering the receptacle will be increased on account of the large pipe 4. This increased volume will be of less density since it will not have had sufficient time to become concentrated in the tank 1. For, it is obvious that the greatest concentration or density is at the bottom of the tank and that when the lower mass is quickly drawn off by the two pipes, the upper strata that replaces the lower mass, will have less density or specific gravity than that which was drawn off, and that when the valve in the pipe 4 is closed, and the syrup is only drawn through the restricted passage of pipe 3, the syrup of higher density only will be drawn off.

As soon as the increased flow of fluid has sufficiently decreased the density, the receptacle will rise and cause the automatic valve in pipe 4 to be closed again. so that the flow will only be through the by-path 3.

In Figures 6 to 8, I have illustrated a modified form of structure for carrying out my invention. In this modified structure, a single pipe line 31 extends from the tank 1 to the rotary pump 6ª from which the fluid is conveyed by the siphon pipe 7 to the balanced receptacle 8. Below the pump 6ª the pipe line 31 is provided with the usual valve 32 and a second specially constructed valve mechanism shown in detail in Figures 7 and 8.

This specially constructed valve mechanism comprises a rotary and cylindrical valve member 33 fitting in a valve housing 34 which forms a coupling in the pipe; the housing being provided with a cylindrical bore which extends transversely beyond both sides of the passage therethrough for receiving said valve member. The outer end of the valve member 33 is provided with a circular sealing head 35 which abuts an annular flange 36 surrounding the outer end of the cylindrical bore in the housing. The flange 36 and head 35 have interfitting grooves and beads or ridges and a ring-like anchoring member 37 provided with a raceway 38 formed by an annular shoulder 39 is secured to the flange 36 with the edge margin of the circular sealing head in the raceway. In order to obviate friction, ball bearings may be mounted between the shoulder 39 and the sealing head in properly constructed grooves therefor. The sealing head is provided with a crank 40 properly balanced by a counterweight 41 that compensates for the connections to the crank.

In order to further reduce friction and to effectively seal the valve, a liquid seal may be provided by putting grooves 42 in the outer neck of the valve member and forming a passage 43 from the outer circumference of the flange 36 to a point between the abutting surfaces of the flange 36 and sealing head 35, and inserting a cock 44 in the outer end of the passage 43 whereby a sealing liquid may be admitted and caused to flow between the valve member 33 and its housing.

The valve member 33 is provided with a passage 45 therethrough which may be brought into alinement with the passage in the housing to allow the fluid to flow therethrough, or the valve member may be rotated to decrease or entirely close the passage through the housing. It is desirable that small arcs of oscillation of the valve member 33 should produce substantial variations in the flow through the passage in the housing, and for this purpose the passage in the valve housing is greatly restricted adjacent the valve member 33 and the port 45 in the valve member is made equal to the restricted opening so that oscillations of less than 90° will completely open or nearly close the valve. The valve, however, is never wholly closed. Fractional oscillations thereof will produce a substantial variation for increasing or decreasing the flow.

The valve member 33 is automatically operated by increases and decreases in the weight of the balanced receptacle 8 caused by changes in the specific gravity of the contained fluid; the crank arm 40 of the valve member being connected by a light stiff rod 46 to the end of the scale beam 47 that supports the receptacle 8 for this purpose. The scale is substantially the same as the one described and illustrated in Figure 1, and need not be further discussed. The relation of the crank 40 and the valve member is such that when the crank is in true horizontal position and the scale is in balance, as shown in Figure 6, the valve 33 is partially closed, as shown in dotted lines in Figure 8.

Now, assuming that the balanced receptacle is completely filled to overflowing and the parts are in balance, and the pump 6ª is drawing the fluid from the tank 1 through the partially closed valve, it will be evident that the fluid drawn through the restricted opening will be the heaviest or greatest density in the tank. Should the density of the pumped mass be sufficiently high to cause the receptacle 8 to overbalance the weight 16, the rod 46 will be forced down to open the valve further, thereby increasing the flow of syrup or fluid which will be of a lower density since the increase of flow will draw syrup or fluid from the upper strata which is of less density or specific gravity. As this lighter fluid or syrup reaches the receptacle 8, it will cause the same to rise, thereby closing the valve to some extent so that fluid of the proper density will flow again in balanced position. In this way the density of the fluid is automatically regulated so that a substantially uniform and desired density is secured.

It will accordingly be apparent that I have devised a novel apparatus for automatically regulating the density of fluids that is simple and efficient and produces a final uniform density.

Of course, so far as valve actuation is concerned, an electrically operated regulating valve may be actuated by suitable electrical contact effected by movement of the beam if preferred.

I am aware that numerous details of construction may be varied through a wide range without departing from the principles of this invention, and I therefore do not purpose limiting the patent granted otherwise than necessitated by the prior art.

I claim as my invention:

1. In an apparatus of the class described, a pivotally supported scale beam, a receptacle supported upon one end of the scale beam, means for balancing said scale beam when said receptacle contains a predetermined quantity of fluid of a predetermined density, an evaporator, a pipe line connected to said evaporator and emptying into said receptacle, a by-path connecting said evaporator and pipe line, a valve in said pipe line, an air line, a diaphragm connecting said air line and valve, a valve in said air line and means connecting said last mentioned valve and scale beam.

2. In an apparatus of the class described, a pivotally supported scale beam, a fluid receiving receptacle supported thereon, an evaporator, a system of pipes leading from said evaporator to said receptacle, said system comprising an adjustable valve, means for controlling said valve and means responsive to the tilting of said scale beam for controlling said first mentioned means.

3. In an apparatus of the class described, a fluid receiving receptacle, a scale for balancing the same, an evaporator, a system of pipes leading from said evaporator and emptying into said receptacle, said system comprising a pump and an adjustable valve, and automatic means controlled by an unbalanced position of said scale for regulating said valve.

4. In an apparatus of the class described, a fluid receiving receptacle, an evaporator, means for supplying fluid from said evaporator to said receptacle, a pivotally supported scale beam for supporting said receptacle adapted to be unbalanced by variations of the density of the fluid in said receptacle, and means for regulating the flow of fluid to said receptacle according to its density.

5. In an apparatus of the class described, a fluid holding receptacle, a support therefor responsive to variations in the density of a predetermined quantity of fluid in said receptacle, means for causing fluid to flow into said receptacle, means for receiving the fluid from said receptacle above the predetermined quantity, and means automatically operable by a movement of said support for varying the density of the fluid flowing into said receptacle.

6. In an apparatus of the class described, a fluid holding receptacle, a fluid supply system for causing fluid to flow into and out of said receptacle, a support for said receptacle responsive to variations in the weight of the fluid in said receptacle, and means responsive to movements of said support for controlling said fluid supply system.

7. In an apparatus of the class described, a scale beam, a receptacle suspended therefrom, a fluid supply system for supplying fluid to said receptacle, said receptacle being in balanced position when containing a predetermined quantity of fluid of a predetermined density and means responsive to a tilting movement of said scale beam for controlling the density of the fluid flowing to said receptacle.

8. In a device of the class described, a fluid receiving receptacle, a fluid supply system for supplying fluid to said receptacle, means responsive to changes of density of the fluid in said receptacle for supporting said receptacle and means responsive to variations in the first mentioned means for controlling said supply system.

9. In an apparatus of the class described, a fluid receiving receptacle, a scale for balancing the same, a fluid supply system for supplying fluid to said receptacle, said system embodying adjustable valve mechanism, and fluid means operated by movements of said scale for regulating said valve mechanism.

10. In an apparatus of the class described, a fluid receiving receptacle, a scale for supporting said receptacle, means for supplying fluid to said receptacle, means for receiving the fluid from said receptacle, and means automatically operable by an unbalanced movement of said scale for regulating said fluid supply means.

11. An apparatus for obtaining uniform density of a fluid, comprising a receptacle, a fluid supply system for causing the fluid to flow through said receptacle with a predetermined amount remaining in the receptacle, a support for said receptacle responsive to variations in the density of the predetermined amount of liquid in said receptacle, valve mechanism for regulating said supply system and means automatically actuated by a movement of said support for controlling said valve mechanism.

12. An apparatus for obtaining uniform specific gravity of a fluid, comprising a fluid system, a balanced receptacle in said system adapted to be unbalanced by a change of density in the fluid, and means controlled by the unbalanced position of said receptacle for controlling the density of the fluid.

In testimony whereof I have hereunto subscribed my name.

EMILE F. SALICH.